March 29, 1960 R. ALTMAN 2,930,209
BEAD NECKLACE-BROOCH COUPLING ELEMENT AND ARTICLE
OF JEWELRY INCORPORATING THE SAME
Filed June 26, 1958 2 Sheets-Sheet 2
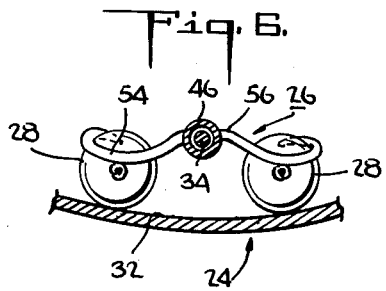
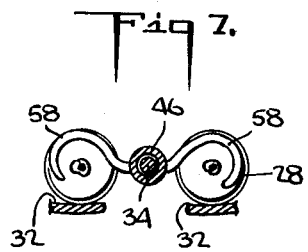
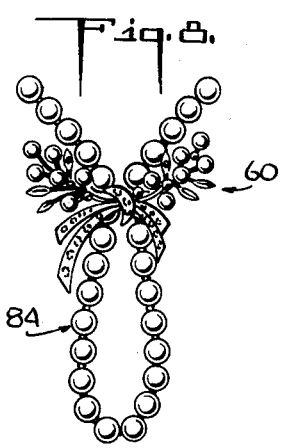
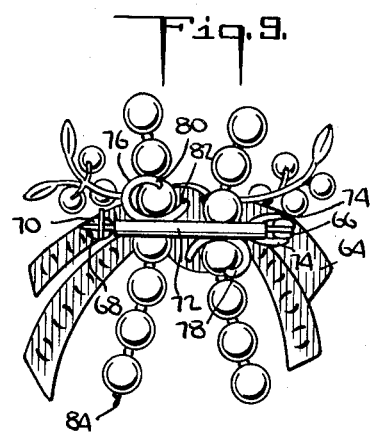
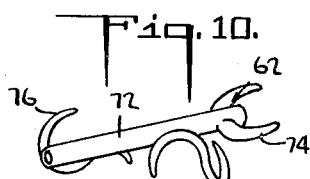
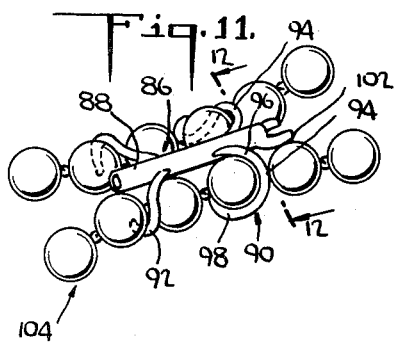
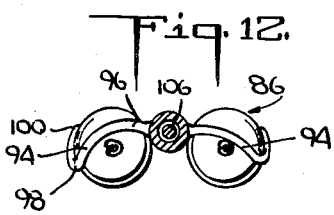
INVENTOR.
ROBERT ALTMAN
BY
ATTORNEYS

United States Patent Office

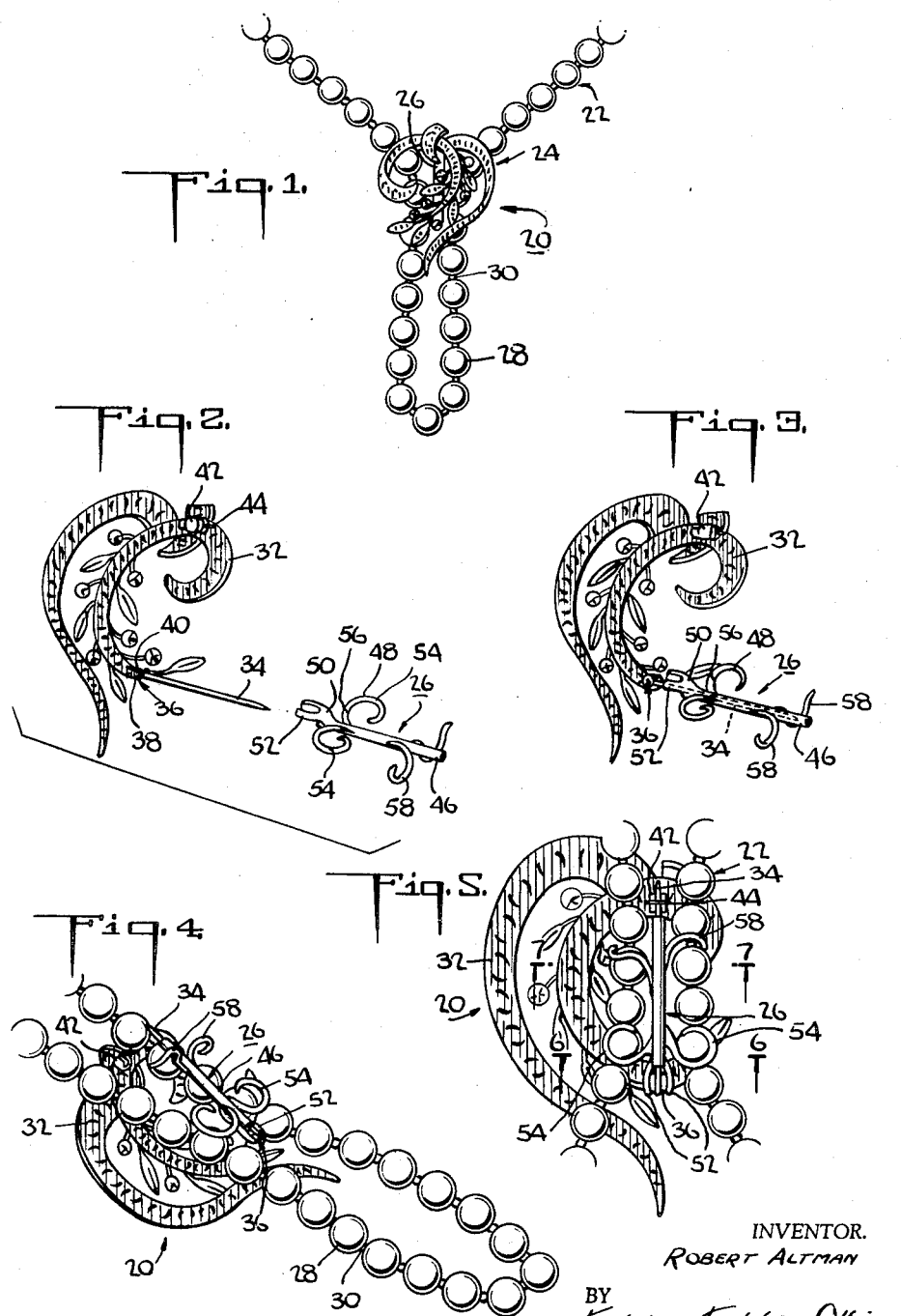

2,930,209
Patented Mar. 29, 1960

2,930,209

BEAD NECKLACE-BROOCH COUPLING ELEMENT AND ARTICLE OF JEWELRY INCORPORATING THE SAME

Robert Altman, Bronx, N.Y.

Application June 26, 1958, Serial No. 744,695

14 Claims. (Cl. 63—1)

This invention relates to a bead necklace-brooch coupling element and to an article of jewelry incorporating the same.

It is an object of my invention to provide a coupling element of the character described which is unobtrusive and compact so that an article of jewelry constituting a brooch and a bead necklace interengaged thereby will not have its appearance spoiled by the element.

It is another object of my invention to provide a coupling element of the character described which is very easy to manipulate both for connecting and disengaging a bead necklace and a brooch, and which, when in operative position, is firmly attached to the necklace so that the brooch when coupled will not come loose accidentally.

It is another object of my invention to provide a coupling element of the character described which constitutes very few parts so that it can be made easily and at a low cost.

It is another object of my invention to provide a coupling element of the character described which will permit brooches to be mounted in various fashions on bead necklaces, e.g. with the key of the brooch running parallel to or transversely of the strands of the necklace.

It is another object of my invention to provide a coupling element of the character described which will not harm the beads of a necklace, and which can be arranged at will anywhere on the necklace.

It is another object of my invention to provide a coupling element of the character described which will at the same time that it secures the brooch in place bridge adjacent strands of the necklace so as to form a short loop of the necklace below the brooch, thus creating a pleasing ornamental effect which can be arranged to be esthetically integrated with the design of the brooch.

It is another object of my invention to provide a coupling element of the character described with which not only is the brooch when positioned thereby held against movement in a direction parallel to the strands of the necklace but also will be held against angular disorientation in relation to said strands.

Other objects of my invention in part will be obvious and in part will be pointed out hereinafter.

My invention accordingly consists in the features of construction, combinations of elements, and arrrangements of parts which will be exemplified in the coupling elements and articles of jewelry hereinafter described, and of which the scope of application will be indicated in the appended claims.

In the accompanying drawings in which are shown various possible embodiments of my invention:

Fig. 1 is a front elevational view of a fragment of a bead necklace and of a brooch which have been combined by a coupling element according to the present invention;

Fig. 2 is a perspective view of the coupling element and the brooch, the latter being shown open, and with the coupling element disengaged from the pin of the brooch;

Fig. 3 is a view similar to Fig. 2, but showing the coupling element partly engaged with the pin;

Fig. 4 is a rear perspective view showing the brooch coupling element and necklace in almost fully coupled position;

Fig. 5 is a rear view of the brooch, the coupling element and the necklace shown in Fig. 1;

Figs. 6 and 7 are enlarged sectional views taken substantially along the lines 6—6 and 7—7, respectively, of Fig. 5;

Fig. 8 is a view similar to Fig. 1 of a brooch, a coupling element and a bead necklace embodying a modified form of my invention;

Fig. 9 is a rear view of the brooch, coupling element and necklace shown in Fig. 8, the same being illustrated on a slightly larger scale;

Fig. 10 is a perspective view of the coupling element employed in the article of jewelry shown in Figs. 8 and 9;

Fig. 11 is a rear perspective view of a bead necklace and coupling element embodying another modified form of my invention, the same being illustrated without the brooch; and Fig. 12 is an enlarged sectional view taken substantially along the line 12—12 of Fig. 11, but illustrating the pin of the brooch within the coupling element.

Referring now in detail to the drawings, and more particularly to Figs. 1 through 7, the reference numeral 20 denotes an article of jewelry constructed in accordance with the present invention. Said article includes three parts, to wit: a bead necklace 22, a brooch 24 and a coupling element 26. The necklace and brooch are entirely conventional. However, the construction of the coupling element and its engagement with the brooch and necklace are basic features of the instant invention.

The necklace constitutes a plurality of individual ornamental beads 28 which are articulatedly connected to one another, a typical example being a series of pearls threaded on a string 30. Optionally, the string may be knotted intermediate the pearls to prevent loss of pearls should the string break. However, it will be understood that this particular necklace, i.e. pearls on a knotted string, is simply given by way of example, and my invention is not to be limited thereto. For instance, the necklace may consist of a series of objects of any material and shape. Moreover, the objects, although preferably of approximately the same shape, need not be of a uniform shape. Also, by way of example, the objects may be graduated in size. It will be apparent, as the description of my invention proceeds, that all of these different kinds of objects can be handled with ease, in accordance with the instant invention.

The brooch 24 has any kind of a body 32, which invariably will be of some comparatively stiff and form-maintaining material, and usually will be metal. The particular metal employed will depend upon the value of the brooch and of the article of jewelry. That is to say, if the jewelry is expensive, the metal of the brooch customarily will be precious, e.g. silver, gold or platinum. Moreover, the body will be artistically configured in some attractive shape, so as to present a desirable appearance. Furthermore, it is quite usual to embellish the body with suitable semi-precious or precious jewels or pearls. However, none of the foregoing features of the body, except the rigidity thereof, have any effect upon the operation of my invention.

The brooch further includes a pin 34 attached to the back of the body 32 by a hinge 36 consisting of a pair of journal arms 38 mounted on the back of the body and pierced in registration to receive a tiny shaft 40. The proximal end of the pin 34 is formed with a conventional eye (not shown) which is rotatable about the shaft 40 thereby to permit said pin to be swung from an open position such as shown in Fig. 2 to a closed position, in which the distal end of the pin is secured to the body of the brooch.

There also is mounted on the back of the body of the brooch a catch 42 in which the distal end of the pin is adapted to be secured. Any one of the standard forms of catch can be employed, there being shown here a U-shaped catch having a rotatable latch 44 which closes the mouth of the catch when the distal end of the pin has been swung into the same. It should be repeated at this point that the physical construction of the brooch, disregarding entirely its ornmamental appearance, is entirely standard, and has been detailed at length above only in order to appreciate the cooperation therewith of the coupling element 26.

Said coupling element basically includes a straight open-ended sleeve 46 and a plurality of members 48 adapted to engage different beads of the necklace. More particularly, the sleeve 46 is of cylindrical, tubular configuration, being large enough to receive the pin 34 of a conventional brooch, and slightly shorter than the distance between the hinge 36 and the catch 42. The ends of the sleeve are open to permit the sleeve to be slipped without hindrance on to the pin 34 of the brooch. Adjacent one end the tube 46 is provided with a radially offset extension 50, terminating in a pair of parallel narrow tines 52. The space between the tines is slightly greater than the width of the hinge whereby said tines may be slid to both sides of the hinge and will lightly rest on the journal arms 38.

The members 48, in the preferred form of my invention, are constituted of wire-like stock, so that they are slender and dainty in construction, and will barely be noticeable when the coupling element is in position.

Specifically, in the coupling element 26, the members 48 are of two types of which one is identified by the reference numeral 54, there being two such members disposed on opposite sides of the sleve 46 in transverse registration. Each said member 54 has a proximal end 56 permanently and rigidly secured to the sleeve, as by silver soldering. The remainder of the member is shaped to permit a bead to be seated thereon, being approximately of circular configuration so as to define substantially a plane circle with a slight break where the distal end of the member 54 approaches the proximal end 56. The circles of the two members 54 may lie in substantially the same plane, but preferably the planes thereof are at a slight angle to one another as is shown in Figs. 2 and 6, the inclination of the two circles being toward the body of the brooch when the coupling element is in use. The circle thus defined by each member 54 has a diameter which is less than the largest dimension of a necklace bead with which it is to cooperate as illustrated herein; in other words, the diameter of the circle defined by each of said members 54 is less than the diameter of the pearl at that part of the necklace to which the coupling element is adapted to be secured.

The other members 48 are denoted by the reference numeral 58. These members are in the shape of hooks and are located at opposite sides of the sleeve, being likewise secured to the tube, as by silver soldering, at their proximal ends. The hooks lie in planes which are substantially perpendicular to the planes defined by the circle-like members 54. Said hooks are located on opposite sides of the sleeve, and each hook is disposed on the same side of the sleeve as an associated member 54. The space between each hook and its associated member 54 is equal to the distance along the necklace string of approximately an integral number of heads. In the case shown, this is the space equal to the distance along the necklace of approximately two pearls.

To couple the brooch 24 with the bead necklace 22, utilizing the coupling element 26 in accordance with my invention, the coupling element is ararnged on a necklace so as to engage beads on two parallel strands of the necklace. More particularly, referring to Fig. 5, the coupling element is placed astride a pair of parallel strands of the necklace, with each member 54 seated on the back of a pearl on a different one of the stands. This may be described from a different point of view: one pearl in one strand of the necklace is seated on one of the members 54 and another pearl in the other strand of the necklace is seated on the other member 54. In addition, the hook-like members 58 are inserted between pairs of pearls on the two strands of the necklace, so that at this time, considering only the coupling element and the necklace, there is a definite interengagement between said coupling element and necklace which is such as to inhibit movement axially of the strands of the beads with respect to the coupling element.

Now, the distal end of the pin 34 is introduced into the end of the sleeve 46 at which the tines 52 are located. The brooch is so held that the hinge is aligned with the space between the tines. Thereby when the pin is fully introduced into the sleeve, the hinge constituting the pierced journal arms 38 will enter between the tines. It should be mentioned that the coupling element is so positioned initially with respect to the strands of the necklace that the radial offset 50 extends in a direction toward the front of the necklace; therefore the body of the brooch will, when swung toward the pin, be located on the sides of the pearls opposite from those seated in the circular members 54. Thus, when the brooch is closed and the distal end of the pin engaged and latched in the catch, the back of the body 32 of the brooch will face the coupling element and the pearls.

The back of the body of the brooch is concave, desirably being arched, the degree of concavity being such that the back of the body of the broach will, when the brooch is closed, bear against the front of the pearls, so that as best seen in Fig. 6, the pearls engaged by the coupling member will be caught and lightly clamped between the circular members 54 and the back of the body of the brooch. This gentle clamping pressure will suffice to hold the brooch securely on the necklace and to prevent shiftable movement thereof. Moreover, axial movement of the brooch along the strands of the necklace relative to the pearls is prevented by the abutment action of the hook-like members 58 which are located between pairs of pearls on the strands of the necklace as shown in Figs. 5 and 7.

Although I have given a specific sequence of steps for joining the bead necklace, the coupling element and the brooch, it readily will be appreciated that this particular sequence does not have to be followed to combine the three elements of the article of jewelry. For example, the coupling element may be slipped on the pin of the brooch and thereafter the coupling element can, with the brooch open, be engaged with the pearls as indicated hereinabove, subsequent to which the brooch is closed.

It also is desired to point out that in the preferred form of my invention, the members 54, 58 due to their slender dimensions and wire-like configurations, being made of metal, have an inherent resiliency which permits them to be flexed somewhat without permanent distortion. This aids in making certain that the pressure exerted between any of these members, for example, the members 54 and the back of the body of the brooch, is gentle, and will not, therefore, mutilate or break the beads of the necklace, particularly, delicate beads such, for instance, as pearls.

It will be observed that the foregoing arrangement has, in effect, subdivided the necklace into two loops, one a loop above the coupling element and brooch, and the other a loop below the coupling element and brooch, each such loop consisting of two strands.

The word "strand" as used herein denotes a length of beads which is vertically disposed when the necklace is allowed to dangle, in contrast to the use of this word connoting a single continuoous string of beads adapted to completely encircle a part of the body, such for instance, as the neck. As I employ the word strand, therefore, a single string necklace consists of two strands.

It will be seen that in the form of my invention described above, the sleeve 46 extends between and parallel to the two strands of the single string necklace and it is apparent that the ornamental design of the brooch is arranged to enhance the appearance of the brooch when thus disposed on a necklace. However, it is to be understood that my invention is not limited to this disposition of the sleeve and brooch pin.

In another form of my invention illustrated in Figs. 8 through 10, I have shown a brooch 60 which is designed to be utilized in conjunction with a coupling element 62, the two being of such construction that the pin of the brooch and the sleeve of the coupling element extend transversely, i.e. perpendicularly, across a pair of strands of the necklace. Said brooch 60 is essentially the same as the brooch 24, consisting of a body 64 with suitable ornamentation, a hinge 66, a pin 68 and a catch 70.

The coupling element 62 constitutes an open-ended straight sleeve 72 having at one end radially offset tines 74 that are parallel to the longitudinal axis of the sleeve. The sleeve is designed to be engaged with the pin 68 and hinge 66 in the manner already described with respect to the coupling element 26. Secured, as by silver soldering, to the tube 72 are a pair of members 76, 78 shaped to engage beads on the necklace. Unlike the coupling element 26 which includes four bead engaging members, the coupling element 62 only includes two such members 76, 78. Said members are located at diametrically opposite sides of the sleeve 72, and are spaced apart axially of the length of the sleeve whereby one member 76 will engage a bead on one of the strands of the necklace and the other member 78 will engage a bead on the other strand, the second bead being axially disaligned from the first.

Specifically, each member 76, 78 includes a portion which is adapted to have seated therein a necklace bead. However, the members are not substantially plane as are the members 54 of the first described coupling element 26. Instead, the opposite ends of each of the members 76, 78 are turned in opposite directions. Referring for example to Fig. 9, one end 80 of each member 76 extends away from the brooch while the other end 82 extends toward the brooch. These ends engage the sides of the bead seated in said member so as to inhibit axial displacement thereof, while the central portion of each members seats the bead. Thus, in effect, the members 76, 78 performs the function both of the seating member 54 and the hook member 58 of the coupling element 26. This enables me to utilize only two bead engaging members instead of the four bead engaging members described with respect to the first form of my invention.

The coupling element 62 is used to join the brooch 60 to a necklace 84 in substantially the same manner as the coupling element 26, bearing in mind that the members 76, 78 engages axially non-registered beads on different strands of the necklace. In this second form of my invention, as well as in the first described form, the beads are lightly clamped between the back of the body of the brooch and the members 76, 78, i.e. the coupling element 62 has its bead engaging members 76, 78 disposed on one side of the necklace, the inner side which is adjacent the wearer, and the brooch is disposed on the outer side of the necklace.

It also is within the scope of my invention to provide a coupling member which is adapted to engage the beads of a necklace without the aid of the body of the brooch, although even under such conditions, it still is desirable to captively secure the beads between the coupling element and the back of the body of the brooch. More particularly, referring to Figs. 11 and 12, I there have disclosed a coupling element 86, constituting an open-ended sleeve 88 on which there are provided two types of bead engaging members 90, 92. There are two of the members 90, which optionally are arranged in transverse registration on diametrically opposite sides of the sleeve being suitably permanently secured to the sleeve, as are the members 92, e.g. by silver soldering.

The members 90 are prehensile, i.e. are configured to resiliently grippingly engage the necklace beads. To effect this purpose, each member 90 is made of wire-like resilient material, e.g. metal, and constitutes a retroverted bend 94, the opposite ends 96, 98 of which extend in the same direction away from the plane of the bend and are spaced apart a distance slightly less than the diameter of the bead to be engaged, whereby the bead can be placed against the bend between and to one side of said ends and then forced past the ends to their other side. One of the ends, e.g. the end 98 is formed with a tip 100 extending in the same direction as that toward which the bead is forced between the pair of ends. Said tip is turned inwardly to lie in the path of movement of the bead being pushed past said ends, and to be abutted by the bead as soon as it has moved beyond the ends and the ends start to spring back together behind the bead. Thereby the bead is forced by the resiliency of the ends against the tip 100 and thus will be grasped by the member 94 to be held firmly in position with respect to the coupling element. Each of the two members 94 thus will grasp in prehensile fashion two registered beads in the two side-by-side strands of the necklace.

The other members 92 are of hook-like configuration and function in the same manner as the members 58 described with respect to the coupling element 26.

The sleeve 88 is provided at one end thereof with parallel radially offset tines 102, the operation of which is identical to that of the tines of the coupling elements previously described.

The coupling element 90 is secured to a necklace 104 with the sleeve 88 lying between and parallel to the strands as shown in Fig. 11, and thereafter, a brooch, not shown in Fig. 11, has the pin 106 thereof introduced into the sleeve with the body of the brooch located on the opposite side of the beads from that engaged by the members 94, so that when the brooch is closed, the beads engaged by the coupling element will be caught between the coupling element and the back of the body of the brooch, although not necessarily abutted by the back of the brooch.

It thus will be appreciated that I have provided coupling elements and articles of jewelry which achieve the various objects of my invention, and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. An article of jewerly comprising a necklace including a string of beads, a brooch constituting a body, a pin, a hinge pivotally connecting one end of said pin to the back of said body and means for detachably securing the other end of said pin to the back of said body, and an independent coupling element separate from the brooch and necklace for detachably securing the brooch to the necklace, said coupling element comprising an open-ended sleeve in which the pin of the brooch is slidably received and plural bead engaging members permanently secured to said sleeve and each engaging a different bead of the necklace on one side thereof, the back of the body of the brooch being located on and bearing against the opposite side of each of said engaged beads.

2. An article of jewelry as set forth in claim 1, wherein at least one bead engaging member includes a seat portion in which a bead is seated, said bead being lightly clamped between the seat portion and the back of the body of the brooch.

3. An article of jewelry as set forth in claim 1, wherein at least one bead engaging member is hook-shaped and is located between a pair of adjacent beads.

4. An article of jewelry as set forth in claim 1, wherein at least one bead engaging member includes a prehensile finger which grasps the bead engaged by the member.

5. An article of jewelry as set forth in claim 1, wherein the coupling element detachably secures the brooch to a pair of side-by-side strands of the necklace, with the sleeve parallel to and between the strands.

6. An article of jewelry as set forth in claim 1, wherein the coupling element detachably secures the brooch to a pair of side-by-side strands of the necklace, with the sleeve extending transversely across the strands.

7. An article of jewelry as set forth in claim 1, wherein the sleeve includes at one end thereof a pair of spaced tines which engage opposite sides of the hinge.

8. An article of jewelry as set forth in claim 1, wherein the sleeve includes at one end thereof a pair of spaced tines radially offset from the sleeve and engaging opposite sides of the hinge.

9. A coupling element for detachably securing to a necklace including a string of beads, a brooch consisting of a body, a pin, a hinge pivotally connecting one end of said pin to the back of said body, and means for detachably securing the other end of said pin to the back of said body, said coupling element being separate from said necklace and brooch and comprising an open-ended tube in which the pin of the brooch is slidably receivable and plural bead engaging arcuate wire members permanently secured to and projecting from the tube at spaced points thereon and each including a portion of circular configuration adapted to engage a different bead of the necklace on one side thereof while the back of the body of the brooch is located on and bears against the opposite side of each of said engaged beads.

10. A coupling element as set forth in claim 9, wherein at least one bead engaging member includes a seat portion in which the bead is adapted to be seated while said bead is lightly clamped between the seat portion and the back of the body of the brooch.

11. A coupling element as set forth in claim 9, wherein at least one bead engaging member is hook-shaped and is adapted to be located between a pair of adjacent beads.

12. A coupling element as set forth in claim 9, wherein at least one of the bead engaging members includes a prehensile finger adapted to grasp the bead engaged by the member.

13. A coupling element as set forth in claim 9, wherein the sleeve includes at one end thereof a pair of spaced tines adapted to engage opposite sides of the hinge.

14. A coupling element as set forth in claim 9, wherein the sleeve includes at an end thereof a pair of spaced tines radially offset from the sleeve and adapted to engage opposite sides of the hinge.

References Cited in the file of this patent

UNITED STATES PATENTS

| | | |
|---|---|---|
| 907,834 | Marshall | Dec. 29, 1908 |
| 992,659 | Hartoch | May 16, 1911 |
| 1,055,428 | Stone | Mar. 11, 1913 |
| 1,578,940 | Wacha | Mar. 30, 1926 |
| 1,720,472 | Gagnon | July 9, 1929 |
| 2,119,436 | Lauff | May 31, 1938 |
| 2,164,657 | Levy | July 4, 1939 |
| 2,274,269 | Jellinek | Feb. 24, 1942 |
| 2,462,425 | Pratt et al. | Feb. 22, 1949 |
| 2,548,140 | Bohlinger | Apr. 10, 1951 |
| 2,644,992 | McFarland | July 14, 1953 |
| 2,775,804 | Ayoub | Jan. 1, 1957 |